United States Patent

[11] 3,586,043

| [72] | Inventor | Lloyd P. Duncan |
| | | Washington, Mo. |
| [21] | Appl. No. | 850,033 |
| [22] | Filed | Aug. 14, 1969 |
| [45] | Patented | June 22, 1971 |
| [73] | Assignee | Zero Manufacturing Company |
| | | Washington, Mo. |

[54] MILKING APPARATUS WITH DUAL VALVE
4 Claims, 3 Drawing Figs.
[52] U.S. Cl. .................................................. 137/587,
137/607, 119/14.05
[51] Int. Cl. ..................................................... A01j 7/00,
F16k 45/00
[50] Field of Search ........................................ 137/587,
588, 607, 609; 251/145, 300, 325, 339; 119/14.05

[56] References Cited
UNITED STATES PATENTS
3,008,450 11/1961 Brunson ...................... 119/14.05
3,031,166 4/1962 Fischer ......................... 251/339 X Primary Examiner—William R. Cline
Attorney—Mason, Mason and Albright ABSTRACT: A milking valve assembly including a housing with a milk outlet is normally under reduced pressure during milking operation. A tapered valve is slidably fitted in an opening into the housing with a movable closure extending adjacent the outlet to open or close the milk outlet. Moving the tapered valve to open the housing to ambient pressure simultaneously closes the milk outlet while sliding the tapered valve to close the opening during milking simultaneously opens the outlet.

PATENTED JUN 22 1971
3,586,043
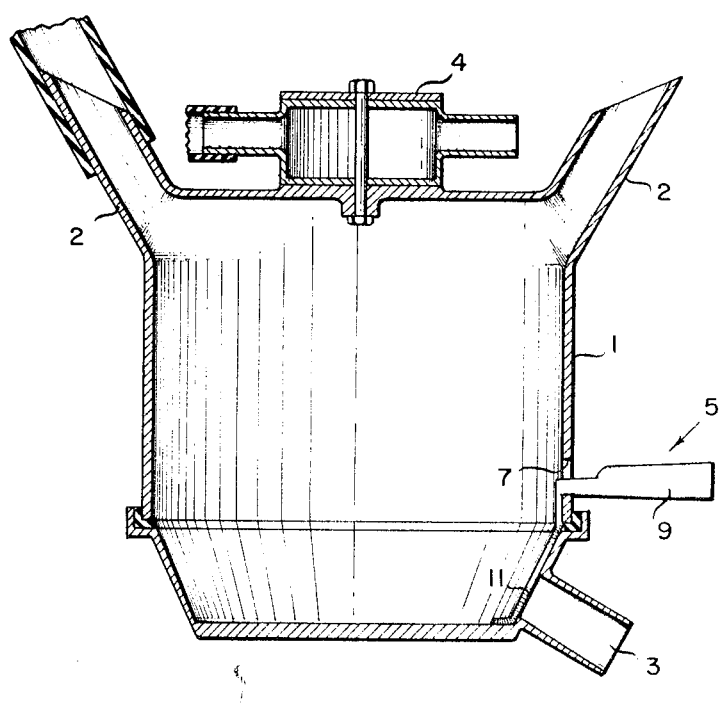
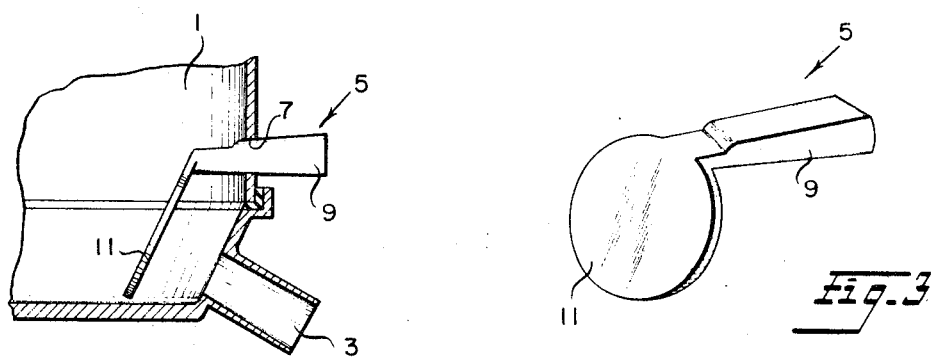
INVENTOR.
LLOYD P. DUNCAN
BY
Mason, Mason & Albright
ATTORNEYS

MILKING APPARATUS WITH DUAL VALVE

This invention relates to milking equipment and more particularly to a claw housing which receives the milk from teat cups attached to a cow being milked. Normally, such a housing is under reduced pressure, suction usually being provided by a conduit attached to the milk outlet at the bottom of the claw housing. Once milking has been completed, it is desirable to quickly dispel the partial vacuum in the housing so that the claw assembly can be quickly released from the cow and avoid the stress on the teats of the cow.

The claw housing and valve structure of the present invention insures that the partial vacuum in the housing will be quickly dispelled while at the same time the milk outlet is closed. Sanitizing of the claw can then be easily accomplished without contaminating the milk line attached to the outlet. Also, trapped air is prevented from interfering with sanitizing inflations when the teat cups are dipped in wash solution after each cow is milked.

It is an object of the present invention to provide a relatively simple, easy-to-clean valve member that can quickly dispel the partial vacuum established in a milking claw assembly.

It is a further object of this invention to provide a valve which can be quickly operated to open or close the milk outlet of a milking claw, thereby facilitating washing of the claw assembly and housing.

These and other objects will be apparent from the following description and drawings.

FIG. 1 is a section of a claw housing showing the valve closed with respect to the milking outlet.

FIG. 2 is a section of housing showing the milk outlet open with the valve closing the housing to ambient pressure.

FIG. 3 is a perspective view of the valve member.

In FIG. 1, a claw housing 1 for receiving milk through passages 2 has a milk outlet 3 adjacent the bottom of the housing. Normally, THE passages 2 are coupled to teat cups (not shown) which are pulsed by a regulator 4 to induce the flow of milk to the housing 1. With such an arrangement, the outlet 3 is connected to a line leading to a bulk milk tank or other receiver under partial vacuum.

A valve 5 having tow portions, 9 and 11, is positioned to close outlet 3, as seen in FIG. 1. The portion 9 is tapered to slidably fit in an opening 7 of the housing 1. The tapered portion 9 can be used as a handle so that the valve 5 as a unit can be moved. The tapered portion 9 is dimensioned to fit snug in opening 7 when the claw housing is attached to the cow for milking (FIG. 2) and the close fit of portion 9 in the opening retains the valve in this position unitl the valve is pulled. Thus, during milking the outlet 3 is open (FIG. 2) for the passage of milk while opening 7 is closed to ambient pressure to preserve the partial vacuum within claw housing 1. Closing opening 3 simultaneously dispels the partial vacuum by opening the interior of the housing to ambient pressure.

Valve 5 is preferably of flexible material, the tapered portion 9 functioning as a handle while the portion 11 is a flexible flap member, dimensioned to quickly and easily cover outlet 3 so that the suction in the outlet 3 insures substantially complete closure. The outlet 3 leads to a source of reduced pressure, such as a bulk milk tank under partial vacuum.

Once the valve 5 has been moved to close the outlet 3 and open the housing 1 at atmospheric pressure, the entire unit can be washed and sanitized without the risk of introducing sanitizing fluid in the milking line attached to outlet 3. Thus, an operator can invert the entire claw, including teat cups, and immerse the claw in sanitizing liquid such as a dip solution. The valve 5 prevents liquid from entering milk outlet 3 while at the same time allows air to escape through opening 7 so that the interior of the housing 1 fills with the dip solution.

I claim:

1. A milking valve assembly including a housing for receiving milk and a vacuum line entrance into said housing, said housing and entrance normally having reduced pressure during milking operation, an opening in said housing for slidably receiving a valve, said valve being comprised of two portions, a first portion being positioned within said housing adjacent said entrance for opening and closing same and a second tapered portion extending through said opening for opening and closing same relative to ambient atmosphere, said valve being movable whereby said valve can be moved to close said entrance and to simultaneously open said housing to ambient pressure.

2. The valve assembly of claim 1, wherein said first portion is a flexible, disc-shaped member that conforms to closely seat on said outlet.

3. The assembly of claim 1, wherein said entrance is an outlet located adjacent the bottom of said housing.

4. The valve assembly of claim 3, wherein said opening is located in said housing above and adjacent said outlet.